United States Patent [19]

Colombet et al.

[11] Patent Number: 5,279,801

[45] Date of Patent: Jan. 18, 1994

[54] PRODUCTION OF BINARY RARE EARTH/SULFUR OR TRANSITION METAL/SULFUR COMPOUNDS

[75] Inventors: Pierre Colombet, Nantes; Philippe Molinie, Saint Herblain; Michel Spiesser, Nantes, all of France

[73] Assignee: Rhone-Poulenc Chimie, Courbevoie, France

[21] Appl. No.: 648,138

[22] Filed: Jan. 30, 1991

[30] Foreign Application Priority Data

Jan. 30, 1990 [FR] France .............................. 90/01071

[51] Int. Cl.$^5$ .......................... C01F 17/00; C01G 1/12
[52] U.S. Cl. ................................... 423/21.1; 423/263; 423/561.1; 423/562; 423/563; 423/565; 423/567
[58] Field of Search .................... 423/21.1, 561.1, 562, 423/563, 565, 567 R, 263

[56] References Cited

U.S. PATENT DOCUMENTS 3,748,095 7/1973 Henderson et al.
4,863,882 9/1989 Matsuda et al. ................... 423/21.1

OTHER PUBLICATIONS

Nippon Kagaku Kaishi, (12), 2438-40/1972 Au Toide, et al.
Journal of Physics E. Scientific Instruments, vol. 3, No. 4, (Apr. 1970), Ishing, Bristol GB p. 317 S. Marich: "The Preparation of High Purity, Metal-Sulfur Alloys".
Gmelin: "Handbook of Inorganic Chemistry" 1983, Springer Verlag, berlin, 8th Ed. part C7, System 39, p. 70, line 5, p. 72, line 1.
Chemical Abstracts, vol. 91, No. 14, Oct. 1979, Columbus, Ohio T. Matsuoka et al: "Metal sulfide with high melting point" p. 101, ref. No. 109611 E.

Primary Examiner—David Brunsman
Attorney, Agent, or Firm—Burns, Doane, Swecker & Mathis

[57] ABSTRACT

Binary rare earth/sulfur or transition metal/sulfur compounds, e.g., the higher sulfides or sesquisulfides of the rare earths, are prepared by confinedly reacting either a rare earth compound, e.g., an oxide, carbonate or hydroxide, or a transition metal oxide, with a carbon compound of sulfur in gaseous state, e.g., $CS_2$, within a sealed enclosure.

17 Claims, 1 Drawing Sheet

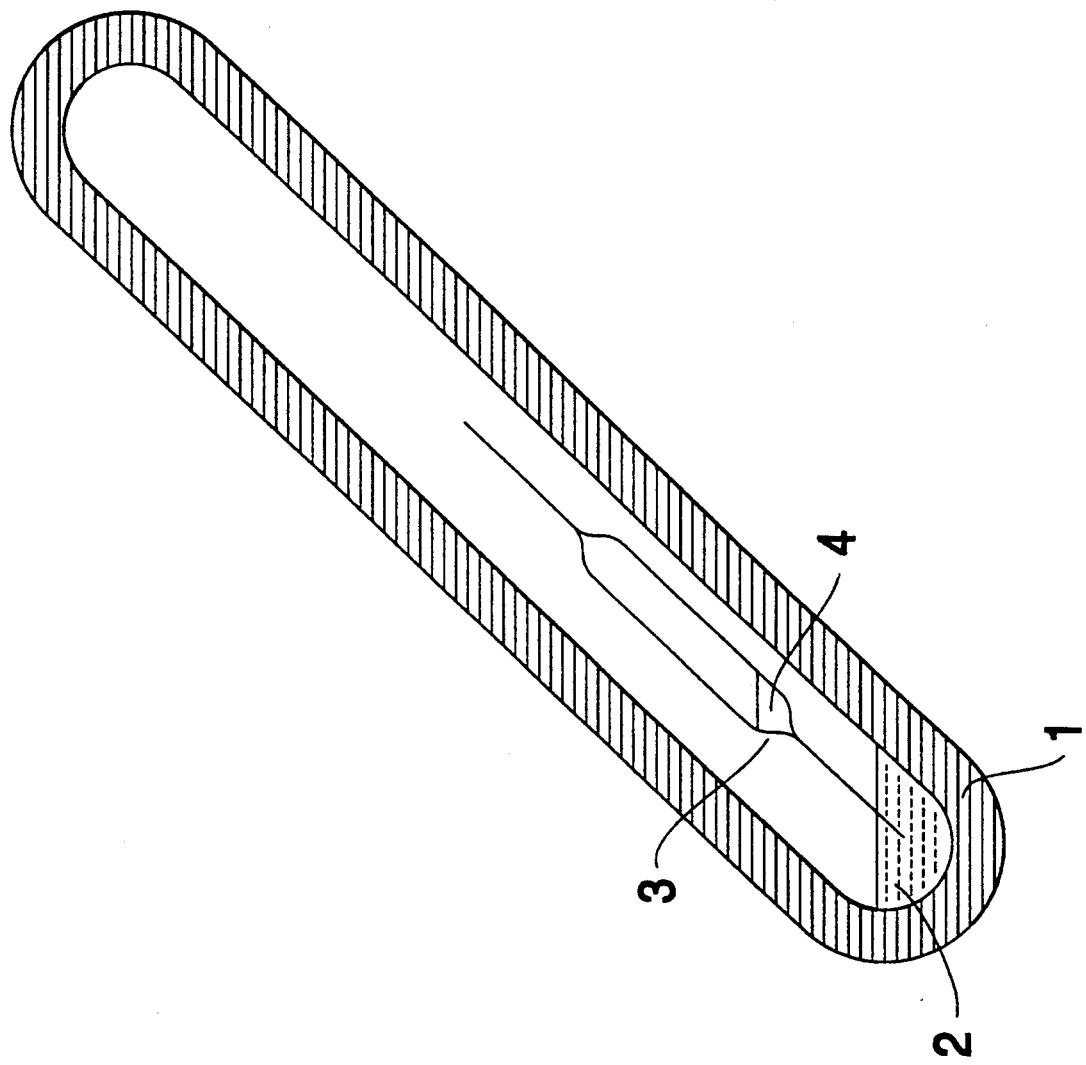

PRODUCTION OF BINARY RARE EARTH/SULFUR OR TRANSITION METAL/SULFUR COMPOUNDS

BACKGROUND OF THE INVENTION

1. Field of the Invention

The present invention relates to the preparation of binary sulfur compounds, the cation of which being a transition metal or a rare earth metal, and more especially, to the preparation of rare earth or transition metal sulfides.

2. Description of the Prior Art

The higher sulfides of the rare earths are useful hydrotreatment catalysts in the petroleum refining industry. The sesquisulfides of the rare earths may be used as colored pigments for plastics, ceramics, ceramic materials, for example glass products. They also find applications in materials constituting optical windows, both for visible light and for infrared. Finally, they are also useful for detecting the presence of sulfur.

The sulfides of the transition metals are industrially useful as hydrotreatment catalysts, lubricants or as electrodes in batteries and cells (for example, photovoltaic cells). They also find applications in the luminescent compound industry.

The synthesis of rare earth sulfides containing at least one element of the lanthanide series, "Ln", having atomic numbers ranging from 57 to 71, or containing yttrium, having an atomic number of 39, by directly reacting such elements with sulfur, is a costly process.

Presently, the synthesis of these sulfides, as particularly described in U.S. Pat. No. 3,748,095 and FR 2,100,551, is carried out by the action of hydrogen or carbon sulfide on an amorphous oxycarbonate or a rare earth oxide at a temperature higher than 1,000° C. Such a synthesis does not permit the use of large amounts of reactants and is therefore difficult to exploit on an industrial scale.

The synthesis of sulfides of the transition metals containing elements having atomic numbers ranging from 21 to 30, 40 to 50 and 72 to 82, is carried out by the action of hydrogen sulfide on a salt of a transition metal, for example a chloride, at moderate temperatures, or by the direct action of the individual elements.

SUMMARY OF THE INVENTION

Accordingly, a major object of the present invention is the provision of an improved process for the synthesis of sulfur compounds of rare earths that can be carried out on an industrial scale, and which otherwise conspicuously ameliorates those disadvantages and drawbacks to date characterizing the state of this art.

Another object of the present invention is the provision of an improved process for the preparation of sulfides of the transition metals.

Briefly, the present invention features an improved process for the synthesis of binary sulfur compounds, in particular sulfur compounds of the rare earths and sulfides of the transition metals, comprising reacting either a rare earth compound or an oxide of a transition metal with a sulfur compound of carbon in the gaseous state, characterized in that the reaction is carried out in a sealed enclosure.

DETAILED DESCRIPTION OF THE PREFERRED EMBODIMENTS OF THE INVENTION

More particularly according to the present invention, the subject sulfurization reaction is a surface reaction requiring the penetration of the sulfurizing gas into the solid precursor. Without wishing to be bound by any particular theory, the process of the reaction is believed to be a function of the migration in the inverse direction, for example, of $O^{2-}$ and $S^{2-}$ anions. The amount of the carbon compound of sulfur used is at least equal to the stoichiometric amount necessary to convert the rare earth compound or compounds into a sulfur compound of the rare earth or earths and is advantageously 20% to 150% by weight greater than such stoichiometric amount.

The temperature of the reaction is not critical according to the invention, in contrast to certain other parameters, such as the stoichiometric ratio of the reactants in the reaction, or the partial pressure of certain reactants, which are more significant. However, as in all reactions of this type, the higher the temperature, the more rapid the kinetics will be. Similarly, to any value of the partial pressure of the carbon compound of sulfur, there corresponds a minimum temperature above which the sulfurizing reaction takes place at an acceptable kinetic rate. Below this temperature, sulfurizing may be effected, but the reaction time required will be very long, rendering the reaction essentially useless on an industrial scale. The final products obtained are in a crystalline state; this is contrary to the state of the art where, in actual practice, only amorphous structures are produced at the temperatures employed in the known processes.

In a preferred embodiment of the invention, the temperature of the reaction ranges from 300° C. to 800° C., more preferably from 350° C. to 600° C. At these temperatures, the compounds produced are in crystalline form.

As indicated above, the sulfuration reaction is a surface reaction which takes place within the mass of the starting material due to the migration of the $S^{2-}$ ions and the anions associated with rare earths, such as $O^{2-}$ for example, in the inverse direction. In a first stage, it is advantageous to facilitate the penetration of the carbon compound of sulfur into the starting material. This penetration is advantageously facilitated by a high partial pressure of the carbon compound of sulfur, by a small grain size and an open crystallographic structure of the starting materials. The initial partial pressure at the reaction temperature of the carbon compound of sulfur, therefore, advantageously ranges from $10^5$ to $150 \times 10^5$ Pa, preferably from $10 \times 10^5$ to $150 \times 10^5$ Pa.

In another preferred embodiment of the invention, the grain size distribution or granulometry of the rare earth compounds and the oxides of the transition metals advantageously ranges from 0.003 to 1,000 μm.

According to another embodiment of the invention, the sulfuration may be carried out by the treatment, in several stages, of the rare earth compound by the carbon compound of sulfur. The total yield of the conversion of the sulfur compound is thereby improved. Consequently, a fresh amount of the carbon compound of sulfur, calculated as a function of the degree of progress of the reaction, is added to the sealed enclosure, following the elimination of the gaseous phase (residual $CS_2$ and carbon monoxide). The retreatment has the effect of establishing a high partial pressure of the carbon compound of sulfur.

However, the reaction is facilitated by providing large ionic radii of the rare earths.

The degree of purity of the raw materials used will control the degree of purity of the final compounds produced. Furthermore, it may be preferable, in particular to eliminate the gaseous components adsorbed on the sulfide produced and to attain the desired purity, to heat treat at a moderate temperature, and preferably under a dynamic vacuum, the final products, especially to eliminate the adsorbed carbon monoxide and carbon compound of sulfur.

According to another characteristic of the invention, the rare earth compound is in the solid state and is selected from among the oxygen compounds of the rare earths, for example from among the oxides, hydroxides, carbonates, oxalates, carboxylates. This rare earth oxygen compound may be a mixed oxygen compound of the rare earths. The rare earth compound may also comprise an inorganic salt of a rare earth selected from among the sulfates and nitrates.

The rare earth compounds used are either in the crystalline or the amorphous state.

Table 1 presents a number of exemplary starting materials and is illustrative only The carbon compounds of sulfur that may be used according to the invention include carbon oxysulfide, carbon monosulfide and disulfide, and the various organosulfur compounds.

Carbon disulfide, which is inexpensive and stable at ambient temperature, is the preferred compound of the invention, because it is in the liquid form at ambient temperature, which facilitates its introduction into the enclosure in large amounts. The carbon compound of sulfur may advantageously contain a small amount of hydrogen sulfide, on the order of 5 mole %, and/or of elemental sulfur.

The sulfur compounds of a rare earth prepared by the process of the invention are the higher sulfides of the $Ln_2S_4$ family. These higher sulfides may also be mixed with a small proportion of a sesquisulfide. However, higher sulfides of formula (I), $Ln_2S_{4-y}$, are also produced, with y ranging from 0 to 0.6, with the exception of europium, for which a mixture of $Eu_3S_4$ and $Eu_2S_{3.8}$ is produced.

The subject process presents the option of directly producing the sesquisulfide under certain operating conditions. In the case of lanthanum, $La_2S_3$ is produced at temperatures greater than 600° C.

The sulfur compounds may also comprise a mixture of sulfur compounds of formula (I) with rare earth oxy-

TABLE 1

| Compound | Symmetry | Space group | Crystalline parameters |
|---|---|---|---|
| $CeO_2$ | Cubic | Fm3m | $a_O = 5.4113$ (1) Å |
| $La_2O_3$ | Hexagonal | P321 | $a_O = 3.9773$ Å $C_O = 6.1299$ Å |
| $La(OH)_3$ | Hexagonal | P6$_3$/m | $a_O = 6.523$ Å $C_O = 3.3855$ Å |
| $La_2(CO_3)_3 \cdot H_2O$ | Orthorhombic | | $a_O = 9$ Å |
| | | | $b_O = 9.58$ Å |
| | | | $c_O = 17.22$ Å |
| $Pr_6O_{11}$ | Mixture: | | |
| | cubic ($PrO_2$) | Fm3m | $a_O = 5.392$ Å |
| | cubic | Ia3 | $a_O = 10.99$ Å |
| $Nd_2O_3$ | Hexagonal | P321 | $a_O = 3.831$ Å $C_O = 5.999$ Å |
| $Nd(OH)_3$ | Hexagonal | P6$_3$/m | $a_O = 6.421$ Å $C_O = 3.74$ Å |
| $Sm_2O_3$ | Mixture: | | |
| | cubic | Ia3 | $a_O = 10.927$ Å |
| | monoclinic | C2/m | $a_O = 14.18$ Å $\beta = 99.97°$ |
| | $\beta = 99.97°$ | | $b_O = 3.633$ Å |
| | | | $c_O = 8.847$ Å |
| $Eu_2O_3$ | cubic | Ia3 | $a_O = 10.868$ Å |
| $Gd_2O_3$ | cubic | Ia3 | $a_O = 10.813$ Å |
| $Tb_4O_7$ | cubic | Fm3m | $a_O = 5.29$ Å |
| $Dy_2O_3$ | cubic | Ia3 | $a_O = 10.654$ Å |
| $Ho_2O_3$ | cubic | Ia3 | $a_O = 10.608$ Å |
| $Er_2O_3$ | cubic | Ia3 | $a_O = 10.547$ Å |
| $Tm_2O_3$ | cubic | Ia3 | $a_O = 10.486$ Å |
| $Yb_2O_3$ | cubic | Ia3 | $a_O = 10.436$ Å |
| $Lu_2O_3$ | cubic | Ia3 | $a_O = 10.393$ Å |
| $Y_2O_3$ | cubic | Ia3 | $a_O = 10.604$ Å |

Table 2 presents an exemplary number of compounds that may be used as starting materials to prepare sulfides of the transition metals.

sulfides of the formulae $Ln_2O_2S$ and/or $Ln_2O_2S_2$ in varying amounts.

These higher sulfides may be transformed into sesquisulfides by a heat treatment under an inert or reducing

TABLE 2

| COMPOUND | SYMMETRY | SPACE GROUP | CRYSTALLINE PARAMETERS |
|---|---|---|---|
| $TiO_2$ | Tetragonal | I4$_1$/amd | $a_O = 3.7252$ Å $c_O = 9.5139$ Å |
| $CrO_3$ | Orthorhombic | Ama$^2$ | $a_O = 5.7494$ Å |
| | | | $b_O = 8.556$ Å |
| | | | $c_O = 4.7961$ Å |
| $MoO_3$ | Orthorhombic | Pbnm | $a_O = 3.963$ Å |
| | | | $b_O = 13.856$ Å |
| | | | $c_O = 3.6966$ Å |
| $Fe_2O_3$ | Hexagonal | R 3c | $a_O = 5.0356$ Å $c_O = 13.7489$ Å |
| $SnO_2$ | Tetragonal | p 4/mnm | $a_O = 4.738$ Å $c_O = 3.188$ Å | atmosphere, preferably at a temperature higher than 700° C.

The sulfides of the transition metals prepared by the present process are compounds of the formulae $MS_2$ or $M_2S_3$. Certain of these sulfides may be converted into lower sulfides by desulfurization.

According to another characteristic of the invention, the final reaction products, quite surprisingly in light of the low working temperatures, are crystalline substances.

The invention thus permits the synthesis, at low temperatures, of sulfides of the rare earths and of the transition metals, on an industrial scale.

In order to further illustrate the present invention and the advantages thereof, the following specific examples are given, it being understood that same are intended only as illustrative and in nowise limitative.

BRIEF DESCRIPTION OF THE DRAWING

In said examples to follow, the reactions were carried out in a sealed enclosure as shown in the accompanying Figure of Drawing.

Also in said examples to follow, all of the yields of the rare earths were calculated by the following formula:

$$R = 100 (1 - ax/2b)$$

In the event where an oxide, $Ln_aO_b$, provided a product with an atomic ratio O/S equal to x/y' per two molecules of the rare earth, with $y' = 4 - y$, in the case where oxygen is absent ($x = 0$).

y is defined in the formula (I), $Ln_2S_{4-y}$, given above.

For praseodymium, cerium and terbium, the starting material oxides have the formulae $CeO_2$, $Pr_6O_{11}$ and $Tb_4O_7$, respectively. For the other elements, the formulation is $Ln_2O_3$.

EXAMPLE 1

This example illustrates the preparation of sulfur compounds of the rare earths, in the assembly shown in the Figure of Drawing. The rare earth oxide 2, present in the solid state, was placed into a Pyrex tube 1 having an inner diameter of 11 mm and a thickness of 2.5 mm. An ampoule 3 containing liquid carbon disulfide 4 was introduced into the tube 1. After sealing the tube 1 at a length of about 10 cm, the assembly was agitated to break the tip of the ampoule 3 containing the carbon disulfide 4 on the inner wall of the tube 1.

The reaction tube was placed inside a horizontal furnace and was subjected to the following thermal cycle: slow heating (over approximately one hour) to 350° to 480° C., maintaining the assembly at this temperature for four hours, followed by slow cooling (over about 5 to 6 hours) to ambient temperature.

At these temperatures, the carbon disulfide was in the gaseous state, and, due to the amounts used (300 to 500 mg), the initial pressure of the carbon disulfide was approximately $25 \times 10^5$ Pa. The tube was then opened to the flame and the residual gases were exhausted by cryopumping.

The retreatments which entailed adding to the sealed enclosures another quantity of the sulfurizing agent following the elimination of the gaseous phase (residual carbon disulfide and carbon monoxide), were carried out by the same procedure and with the proportions of carbon disulfide calculated as a function of the progress of the reaction, with the retreated product being considered the initial oxide.

The following examples all relate to a single treatment according to the aforedescribed process.

EXAMPLE 2

The procedure of Example 1 was repeated, but employing a white cerium oxide of the formula $CeO_2$ and having the following crystallographic characteristic:

Cubic Fm3m $a_O = 5.411$ (1) Å

The volume of the reaction enclosure was 9.5 cm³. The weight of the $CeO_2$ was 0.75 g. The weight of $CS_2$ was 0.33 g (without excess) or 0.44 g (with an excess of 33%). The phases determined after sulfuration were the following:

$Ce_2S_4$ cubic $a_O = 8.106$ (5) Å

$CeO_2$

The results obtained are reported in Table 3:

TABLE 3

| Experiment as a function of: TEMPERATURE Duration: 72 hours Without excess $CS_2$ Without initial grinding | | Experiment as a function of: TIME T = 500° C. Without excess $CS_2$ Without initial grinding | | Experiment as a function of: EXCESS WEIGHT OF $CS_2$ T = 500° C. Duration 48 hours Without initial grinding | |
|---|---|---|---|---|---|
| T | Yield (%) | T | Yield (%) | T | Yield (%) |
| 350° C. | 19 | 2 h | 60 | 0 | 80 |
| 426° C. | 64 | 14 h | 69 | 33 | 95 |
| 488° C. | 78 | 48 h | 80 | | |
| | | 168 h | 84 | | |
| | | 332 h | 87 | | |

EXAMPLE 3

The procedure of Example 1 was repeated, but employing white lanthanum hydroxide of the formula $La(OH)_3$, having the following crystallographic characteristic:

| Hexagonal P63/m | $a_O = 6.523$ Å | $C_O = 3.855$ Å |

The volume of the reaction enclosure was 9.5 cm³. The weight of $La(OH)_3$ was 0.58 g. The weight of $CS_2$ was 0.27 g (excess of 17%) or 0.36 g (excess of 55%). The phases determined after sulfuration were the following:

| $La_2S_4$ monoclinic | a = 8.179 (2) | b = 8.187 (1) |
| | c = 4.122 (1) | β = 90° |
| $La_2O_2S_2$ hexagonal | $a_O = 4.051$ (1) Å | $C_O = 6.944$ (2) Å |
| $La_2S_3$ | | |
| $La_2O_3$ | | |

Results obtained are reported in Table 4:

TABLE 4

| Experiment as a function of: TEMPERATURE Duration: 72 hours $CS_2$ excess: 17% Without initial grinding | | Experiment as a function of: TIME T = 500° C. $CS_2$ excess: 17% Without initial grinding | | Experiment as a function of: EXCESS WEIGHT OF $CS_2$ T = 500° C. Duration 48 hours Without initial grinding | |
|---|---|---|---|---|---|
| T | Yield (%) | T | Yield (%) | T | Yield (%) |
| 350° C. | 66 | 2 h | 74 | 17 | 83 |
| 488° C. | 79 | 14 h | 82 | 55 | 88 |
| | | 48 h | 83 | 75 | 89 |
| | | | | 133 | 95 |

EXAMPLE 4

The procedure of Example 1 was repeated, but employing a cerium sulfate $Ce_2(SO_4)_3 \cdot nH_2O$. The initial weight of the sulfate was 0.535 g and that of the $CS_2$ was 0.172 g. The volume of the enclosure was 9.5 cm$^3$.

The amount of $CS_2$ introduced corresponded to an excess of 20% relative to stoichiometry.

The product obtained was a cerium sulfide of the formula $Ce_2S_4$. The yield was 99%.

EXAMPLE 5

The procedure of Example 1 was repeated, but employing a white titanium dioxide of the formula $TiO_2$ having the following crystallographic characteristic:

| Tetragonal I4$_1$/amd | $a_O$ = 3.785 Å | $C_O$ = 9.514 Å |
|---|---|---|

The volume of the reaction enclosure was 9.5 cm$^3$. The weight of $TiO_2$ was 0.22 g. The weight of $CS_2$ was 0.32 g (excess of 50%). The phases determined after sulfuration were the following:

| TiS$_2$: hexagonal P 3 ml | $a_O$ = 3.412 Å | $C_O$ = 5.695 Å |
|---|---|---|

The yield was calculated from the initial and final weights and was equal to:

$R (\%) = 100 (m_g - m_i)/0.402$   $m_i = 78\%$

EXAMPLE 6

The procedure of Example 1 was repeated, using powders of cerium oxide of varying grain size distribution. The temperature was 500° C. and the initial pressure of carbon disulfide was the same in each case. The results are reported in Table 5 and illustrate the advantage of a small grain size starting material.

TABLE 5

| | CeO$_2$ | | |
|---|---|---|---|
| Grain size distribution (μm) | mCS$_2$ (g) | $m_i/m_f$ (g/g) | Yield (%) |
| 0.1–100 | 0.430 | 0.973/1.147 | 97 |
| 100–200 | 0.419 | 0.946/1.112 | 95 |
| 200–250 | 0.433 | 0.978/1.111 | 76 |
| not ground (100–1,000) | 0.407 | 0.920/1.048 | 78 |

EXAMPLE 7

This example illustrates the effect of the ionic radius. The procedure of Example 1 was repeated using rare earths having varying ionic radii to demonstrate that light rare earths having large-ionic radii are more easily sulfurized than the heavier rare earths having small ionic radii.

The results are reported in Table 6.

TABLE 6

| | Yield R (%) = 100 (1 ax/2b) | | | | | | | |
|---|---|---|---|---|---|---|---|---|
| Rare earth | La | Ce | Pr | Nd | Sm | Gd | Y | Tb |
| Ionic radius Å | 1.061 | 1.034 | 1.013 | 0.995 | 0.964 | 0.938 | 0.930 | 0.923 |
| T (°C.) | | | | | | | | |
| 350° C. | 66 | 19 | 4 | 32 | | 14 | | 20 |
| 426° C. | | 64 | 70 | 52 | 46 | 36 | 5 | |
| 488° C. | 79 | 78 | | | 59 | | 17 | 36 |

EXAMPLE 8

10 g of the La(OH)$_3$ described in Example 1 were introduced into an autoclave having an internal volume of 25 cm$^3$, together with 5 g CS$_2$ (excess of 20%).

The autoclave was heated to 500° C. for 48 hours. The pressure in the autoclave was on the order of $150 \times 10^5$ Pa.

Following cooling of the autoclave and the evaporation of the excess CS$_2$ and the carbon oxides formed, lanthanum sulfide La$_2$S$_4$ was recovered in a yield of 99%.

EXAMPLE 9

The procedure of Example 8 was repeated, but replacing the lanthanum hydroxide with 1.602 g lanthanum nitrate and adding 0.34 g of CS$_2$ (excess of 20%). The La$_2$S$_4$ yield obtained was 99%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a binary rare earth/sulfur or transition metal/sulfur compound, comprising placing either a rare earth compound or a transition metal oxide with a carbon compound of sulfur in a reaction enclosure, sealing said enclosure and confinedly reacting either said rare earth compound or said transition metal oxide with said carbon compound of sulfur in the gaseous state, in said sealed enclosure without removal of reaction products.

2. The process as defined by claim 1, comprising reacting a rare earth compound with said carbon compound of sulfur.

3. The process as defined by claim 2, said rare earth compound comprising an oxygen compound or an inorganic salt.

4. The process as defined by claim 3, said rare earth compound comprising an oxide, carbonate or hydroxide.

5. The process as defined by claim 3, said rare earth compound comprising a sulfate or nitrate.

6. The process as defined by claim 1, comprising reacting a transition metal oxide with said carbon compound of sulfur.

7. The process as defined by claim 1, comprising reacting said rare earth/transition metal reactant with an at least stoichiometric amount of said carbon compound of sulfur.

8. The process as defined by claim 7, comprising reacting said rare earth/transition metal reactant with a 20% to 150% stoichiometric excess of said carbon compound of sulfur.

9. The process as defined by claim 1, carried out at a temperature ranging from 350° to 600° C.

10. The process as defined by claim 1, wherein the initial partial pressure of said carbon compound of sulfur ranges from $1 \times 10^5$ to $150 \times 10^5$ Pa when the total initial pressure within said sealed enclosure is $10^5$ Pa.

11. The process as defined by claim 10, said initial partial pressure ranging from $10 \times 10^5$ to $150 \times 10^5$ Pa 12. The process as defined by claim 1, wherein the granulometry of said rare earth/transition metal reactant ranges from 0.1 to 1,000 μm.

13. The process as defined by claim 12, said granulometry ranging from 0.1 to 200 μm.

14. The process as defined by claim 1, comprising introducing said carbon compound of sulfur into said sealed enclosure after eliminating any residual gaseous phases therefrom.

15. The process as defined by claim 1, further comprising sulfurizing any graphitic carbon formed during the reaction.

16. The process as defined by claim 1, said carbon compound of sulfur comprising carbon disulfide, carbon monosulfide or carbon oxysulfide.

17. The process as defined by claim 1, said carbon compound of sulfur containing hydrogen sulfide and/or elemental sulfur.

* * * * *